United States Patent
Ravi et al.

(10) Patent No.: US 12,204,570 B2
(45) Date of Patent: Jan. 21, 2025

(54) SYSTEM AND METHOD FOR PROVIDING MESSAGE CONTENT BASED ROUTING

(71) Applicant: JPMorgan Chase Bank, N.A., New York, NY (US)

(72) Inventors: Vineeth Ravi, Jersey City, NJ (US); Jessica Staddon, Redwood City, CA (US); Christopher Stang, Malibu, CA (US); Sam Faye, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/143,686

(22) Filed: May 5, 2023

(65) Prior Publication Data

US 2024/0086435 A1 Mar. 14, 2024

Related U.S. Application Data (60) Provisional application No. 63/406,510, filed on Sep. 14, 2022.

(51) Int. Cl.
*G06F 16/332* (2019.01)
*G06F 16/31* (2019.01)
*G06F 16/38* (2019.01)
*H04L 51/02* (2022.01)

(52) U.S. Cl.
CPC ........ *G06F 16/3329* (2019.01); *G06F 16/313* (2019.01); *G06F 16/38* (2019.01); *H04L 51/02* (2013.01)

(58) Field of Classification Search
None
See application file for complete search history.

(56) References Cited

U.S. PATENT DOCUMENTS

| | | | |
|---|---|---|---|
| 2021/0044547 A1* | 2/2021 | Bradley | H04L 51/02 |
| 2022/0200936 A1* | 6/2022 | Higgins | G06F 11/3495 |
| 2023/0090049 A1* | 3/2023 | Elango | G06N 5/022 |
| | | | 705/7.16 |

OTHER PUBLICATIONS

Vineeth Ravi et al., "Hungry Enough for a Chatbot: Automation Opportunities for a Restaurant Recommender", Project presentation at Conversations 2022—the 6th International Workshop on Chatbot Research, Applications and Design, hosted by the University of Amsterdam, Netherlands, Nov. 22-23.
Examination Report dated Jun. 27, 2024 issued in UK Patent Application No. 2308405.6.

* cited by examiner

*Primary Examiner* — Kevin S Mai
(74) *Attorney, Agent, or Firm* — GREENBLUM AND BERNSTEIN, P.L.C.

(57) ABSTRACT

A method for performing differential routing based on message content. The method includes receiving, from a user device, a message inquiry; identifying and extracting one or more keywords from the message inquiry; determining, for each of the one or more keywords, a corresponding tag type; predicting a conversation length based on the determined tag type for each of the one or more keywords; determining whether the message inquiry is amenable to being serviced by an automated service; and routing the message inquiry based on the determining whether the message inquiry is amenable to being serviced by the automated service.

16 Claims, 9 Drawing Sheets

| Message Number | Customer | CSA |
|---|---|---|
| 1 | What's a good buzzing sushi spot in West Hollywood area - sake bombs and the works | |
| 2 | | Hi there! Roku Sunset is your spot for this. 9201 Sunset Blvd., West Hollywood, CA 90069. Kura is also good! 8162 Sunset Blvd., West Hollywood, CA 90046. Let us know if you need any other! |
| 3 | Sweet. Is there anything further south. | |
| 4 | Or something less pricey. | |
| 5 | | Sushi Fumi is reasonably priced and a great spot for sushi! 359 N La Cienega Blvd., Los Angeles, CA 90048 |
| 6 | Done and done! | |
| 7 | | Enjoy! |
| 8 | Thanks! | |

FIG. 5E

SYSTEM AND METHOD FOR PROVIDING MESSAGE CONTENT BASED ROUTING

CROSS-REFERENCE TO RELATED APPLICATION(S)

This application claims the benefit of U.S. Provisional Patent Application No. 63/406,510, filed Sep. 14, 2022, which is hereby incorporated by reference in its entirety.

TECHNICAL FIELD

This disclosure generally relates to a system and method for providing message content based routing for selective servicing by an automated service provider.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

A customer self-service knowledge base, digital assistants for customer service agents and customer-facing chatbots are various ways to scale customer service. Although automated services like chatbots may provide convenience to customers in certain situations, they may also be negatively perceived by customers due in part to communication problems and/or expertise gaps in other situations. Accordingly, chatbots, although able to provide convenience in certain situations, may not perform as well in other situations, leading to inconsistent or negative customer experience.

SUMMARY

According to an aspect of the present disclosure, a method for performing differential routing based on message content is provided. The method includes performing, using a processor and a memory: receiving, from a user device, a message inquiry; identifying and extracting one or more keywords from the message inquiry; determining, for each of the one or more keywords, a corresponding tag type; predicting a conversation length based on the determined tag type for each of the one or more keywords; determining whether the message inquiry is amenable to being serviced by an automated service; routing the message inquiry to the automated service when the message inquiry is determined to be amenable to being serviced by the automated service; and routing the message inquiry to a service agent when the message inquiry is determined not to be amenable to being serviced by the automated service.

According to another aspect of the present disclosure, automated service is provided by a chatbot.

According to another aspect of the present disclosure, the method further includes determining whether a follow-up message is required in response to the predicted conversation length; sending the follow-up message to the user device when the follow-up message is determined to be required; and performing the determining of whether the message is amenable to being serviced by the automated service when the follow-up message is determined not to be required.

According to yet another aspect of the present disclosure, the determining of whether the message is amenable to being service by the automated service is determined based on an aggregated weighted value of the determined tag type for each of the one or more keywords.

According to another aspect of the present disclosure, the determined tag type indicates at least one of a cuisine type, vibe/ambience/theme, price, dietary restrictions, relationships, timing, and gratitude/humor.

According to a further aspect of the present disclosure, the determined tag type indicates at least one of a positive interest or a negative interest, the positive interest being user interest that suggests being amenable to the automated service, and the negative interest being user interest that suggests being better facilitated by a human service agent.

According to yet another aspect of the present disclosure, weighting of the determined tag type is determined based on a heuristic model.

According to a further aspect of the present disclosure, weighting of the determined tag type is determined based on one or more artificial intelligence (AI) or machine learning (ML) models.

According to another aspect of the present disclosure, the determining of whether the message is amenable to being service by the automated service is further determined in view of a reference threshold.

According to a further aspect of the present disclosure, the reference threshold indicates a number of messages expected during a conversation.

According to a further aspect of the present disclosure, the reference threshold indicates a duration of conversation expected.

According to a further aspect of the present disclosure, the reference threshold is adjusted or modified by one or more AI or ML models.

According to a further aspect of the present disclosure, the identifying and extracting one or more keywords are performed via a natural language processing (NLP) algorithm.

According to a further aspect of the present disclosure, weighting of the determined tag type is determined based on a queue to a human service agent.

According to another aspect of the present disclosure, the conversation length is defined by a number of messages exchanged between the user device and the automated service.

According to a further aspect of the present disclosure, the conversation length is defined by a duration of conversation between the user device and the automated service.

According to another aspect of the present disclosure, the message inquiry is one of a text message, an internet-based chatting message, or a voice message.

According to a further aspect of the present disclosure, the determining whether the message inquiry is amenable to being serviced by the automated service is based on availability of a human service agent.

According to another aspect of the present disclosure, a system for performing differential routing based on message content is disclosed. The system includes at least one processor; at least one memory; and at least one communication circuit. The at least one processor is configured to perform: receiving, from a user device, a message inquiry; identifying and extracting one or more keywords from the message inquiry; determining, for each of the one or more keywords, a corresponding tag type; predicting a conversation length based on the determined tag type for each of the one or more keywords; determining whether the message inquiry is amenable to being serviced by an automated service; routing the message inquiry to the automated service when the message inquiry is determined to be amenable to being serviced by the automated service; and routing the message inquiry to a service agent when the message inquiry is determined not to be amenable to being serviced by the automated service.

According to another aspect of the present disclosure, a non-transitory computer readable storage medium that stores a computer program for performing differential routing based on message content is disclosed. The computer program, when executed by a processor, causing a system to perform a process including receiving, from a user device, a message inquiry; identifying and extracting one or more keywords from the message inquiry; determining, for each of the one or more keywords, a corresponding tag type; predicting a conversation length based on the determined tag type for each of the one or more keywords; determining whether the message inquiry is amenable to being serviced by an automated service; routing the message inquiry to the automated service when the message inquiry is determined to be amenable to being serviced by the automated service; and routing the message inquiry to a service agent when the message inquiry is determined not to be amenable to being serviced by the automated service.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
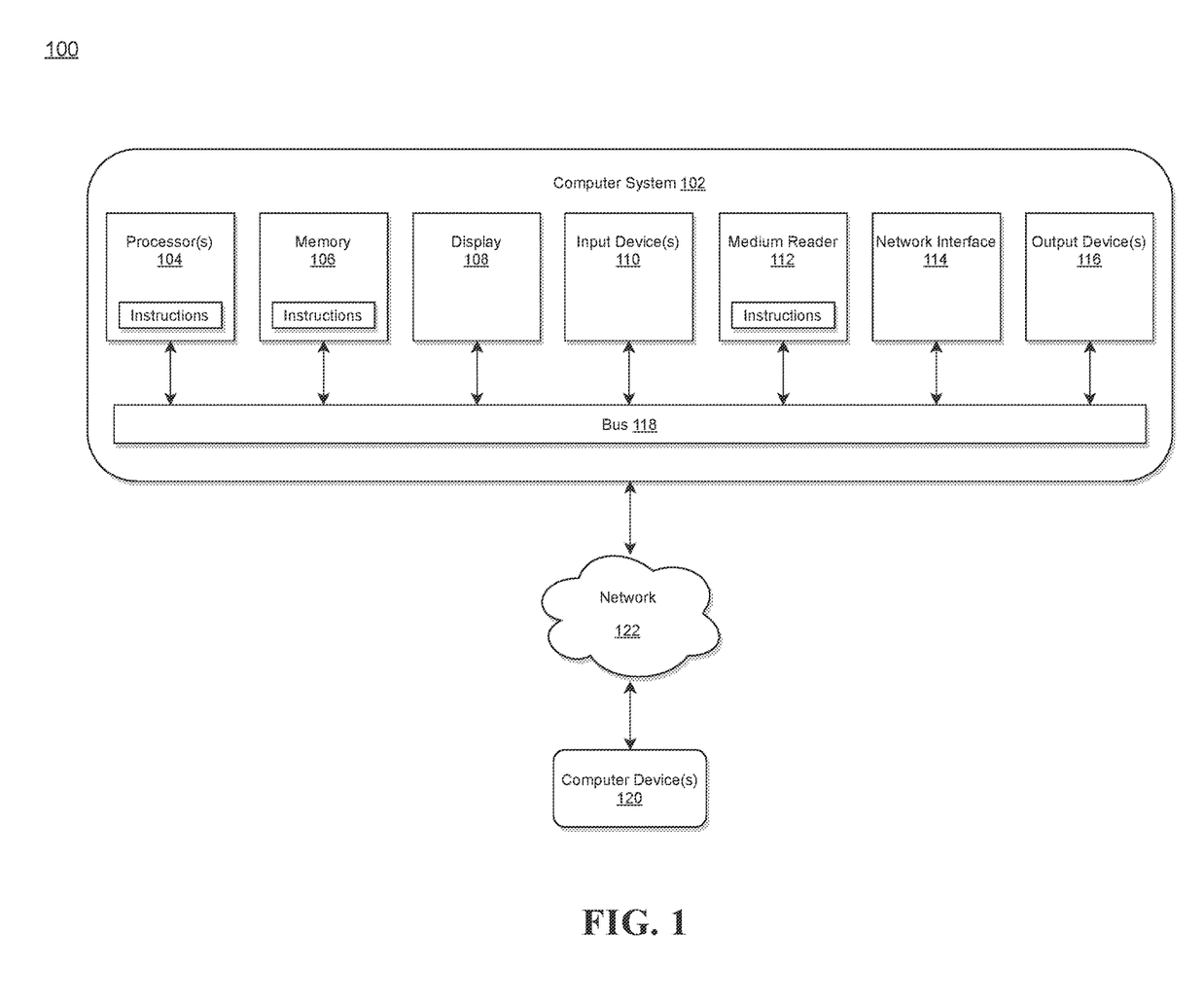
FIG. 1 illustrates a computer system for implementing a message content based routing system (MCBRS) in accordance with an exemplary embodiment.

FIG. 1 illustrates a computer system for implementing a message content based routing system (MCBRS) in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing and an operation mode having parallel processing capabilities. Virtual computer system processing can be constructed to implement one or more of the methods or functionality as described herein, and a processor described herein may be used to support a virtual processing environment.

Figure 2:
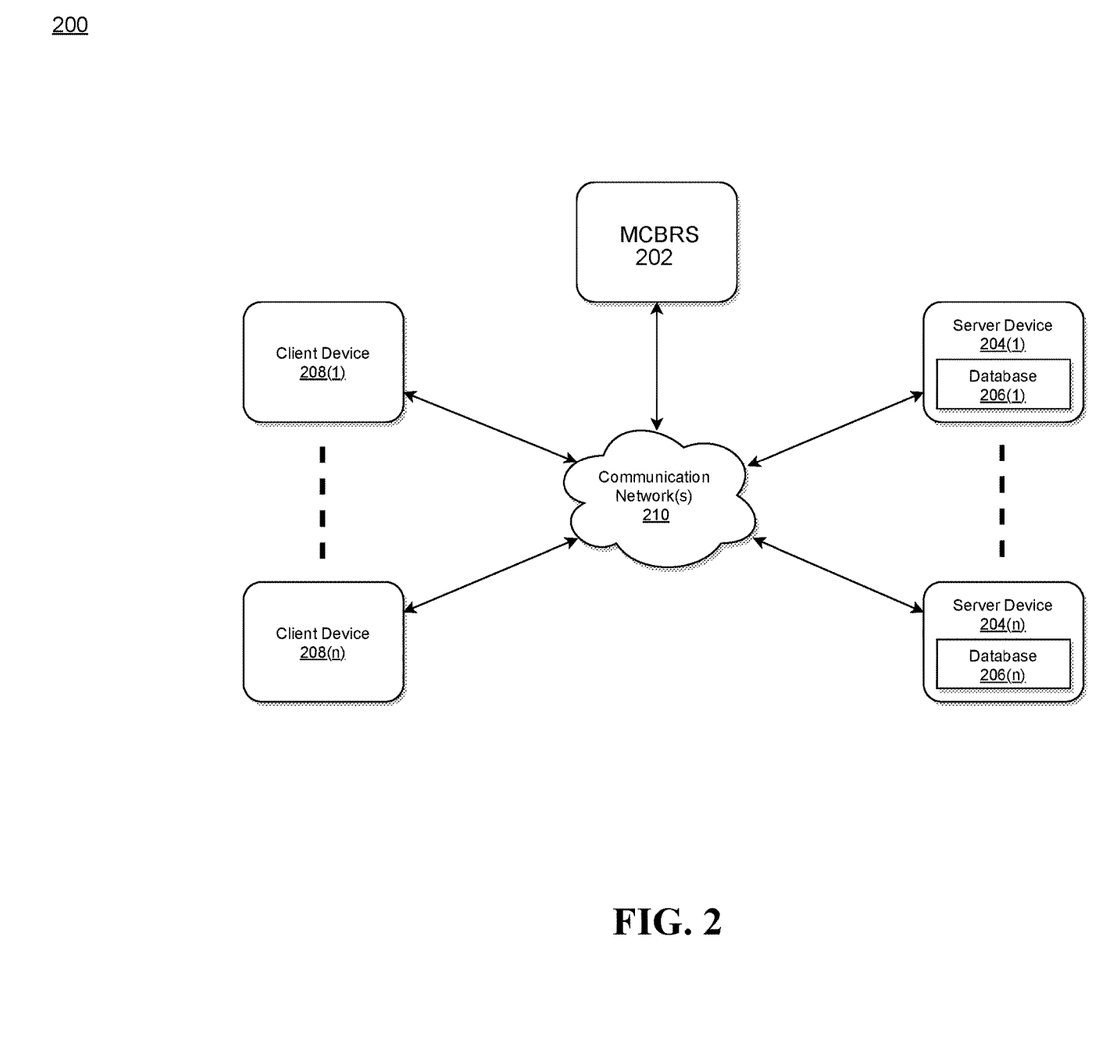
FIG. 2 illustrates an exemplary diagram of a network environment with a MCBRS in accordance with an exemplary embodiment.

FIG. 2 illustrates an exemplary diagram of a network environment with a MCBRS in accordance with an exemplary embodiment.

A MCBRS 202 may be implemented with one or more computer systems similar to the computer system 102 as described with respect to FIG. 1.

The MCBRS 202 may store one or more applications that can include executable instructions that, when executed by the MCBRS 202, cause the MCBRS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the MCBRS 202 itself, may be located in virtual server(s) running in a cloud-based computing environment rather than being tied to one or more specific physical network computing devices. Also, the application(s) may be running in one or more virtual machines (VMs) executing on the MCBRS 202. Additionally, in one or more embodiments of this technology, virtual machine(s) running on the MCBRS 202 may be managed or supervised by a hypervisor.

In the network environment 200 of FIG. 2, the MCBRS 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the MCBRS 202, such as the network interface 114 of the computer system 102 of FIG. 1, operatively couples and communicates between the MCBRS 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MCBRS 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MCBRS 202 may be a standalone device or integrated with one or more other devices or apparatuses, such as one or more of the server devices 204(1)-204(n), for example. In one particular example, the MCBRS 202 may be hosted by one of the server devices 204(1)-204(n), and other arrangements are also possible. Moreover, one or more of the devices of the MCBRS 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MCBRS 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MCBRS 202 that may efficiently provide a platform for implementing a cloud native MCBRS module, but the disclosure is not limited thereto.

The client devices 208(1)-208(n) may run interface applications, such as standard web browsers or standalone client applications, which may provide an interface to communicate with the MCBRS 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MCBRS 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MCBRS 202, the server devices 204(1)-204(n), or the client devices 208(1)-208(n), for example, may be configured to operate as virtual instances on the same physical machine. For example, one or more of the MCBRS 202, the server devices 204(1)-204(n), or the client devices 208(1)-208(n) may operate on the same physical device rather than as separate devices communicating through communication network(s) 210. Additionally, there may be more or fewer MCBRS 202, server devices 204(1)-204(n), or client devices 208(1)-208(n) than illustrated in FIG. 2. According to exemplary embodiments, the MCBRS 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
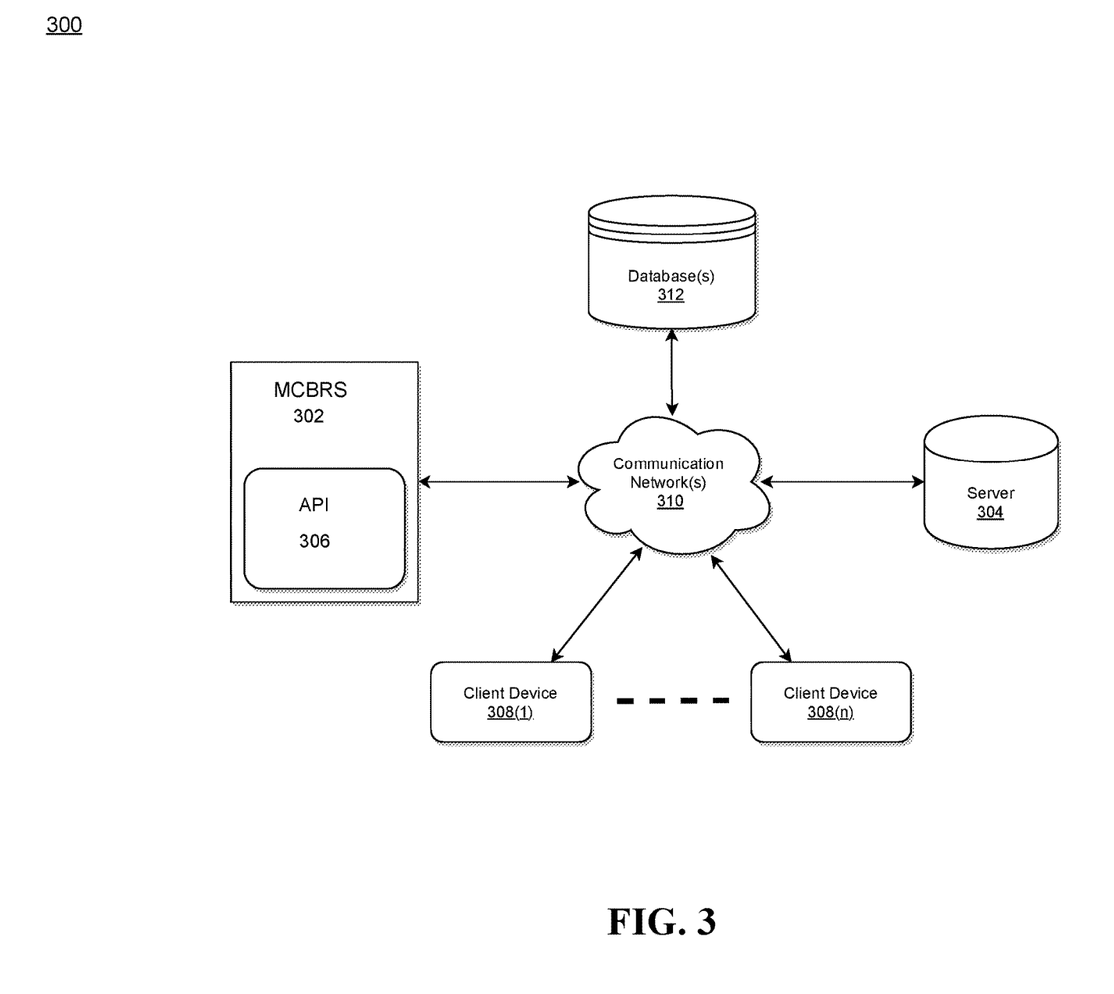
FIG. 3 illustrates a system diagram for implementing a MCBRS in accordance with an exemplary embodiment.

FIG. 3 illustrates a system diagram for implementing a MCBRS in accordance with an exemplary embodiment.

As illustrated in FIG. 3, the system 300 may include a MCBRS 302 within which a group of API modules 306 is embedded, a server 304, a database(s) 312, a plurality of client devices 308(1) . . . 308(n), and a communication network 310.

According to exemplary embodiments, the MCBRS 302 including the API modules 306 may be connected to the server 304, and the database(s) 312 via the communication network 310. Although there is only one database has been illustrated, the disclosure is not limited thereto. Any number of databases may be utilized. The MCBRS 302 may also be connected to the plurality of client devices 308(1) . . . 308(n) via the communication network 310, but the disclosure is not limited thereto.

According to exemplary embodiment, the MCBRS 302 is described and shown in FIG. 3 as including the API modules 306, although it may include other rules, policies, modules, databases, or applications, for example. According to exemplary embodiments, the database(s) 312 may be embedded within the MCBRS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable MCBRS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the MCBRS 302. In this regard, the plurality of client devices 308(1) . . . 308(n) may be "clients" of the MCBRS 302 and are described herein as such. Nevertheless, it is to be known and understood that the plurality of client devices 308(1) . . . 308(n) need not necessarily be "clients" of the MCBRS 302, or any entity described in association therewith herein. Any additional or alternative relationship may exist between either or both of the plurality of client devices 308(1) . . . 308(n) and the MCBRS 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the MCBRS 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The MCBRS 302 may be the same or similar to the MCBRS 202 as described with respect to FIG. 2, including any features or combination of features described with respect thereto.

Figure 4:
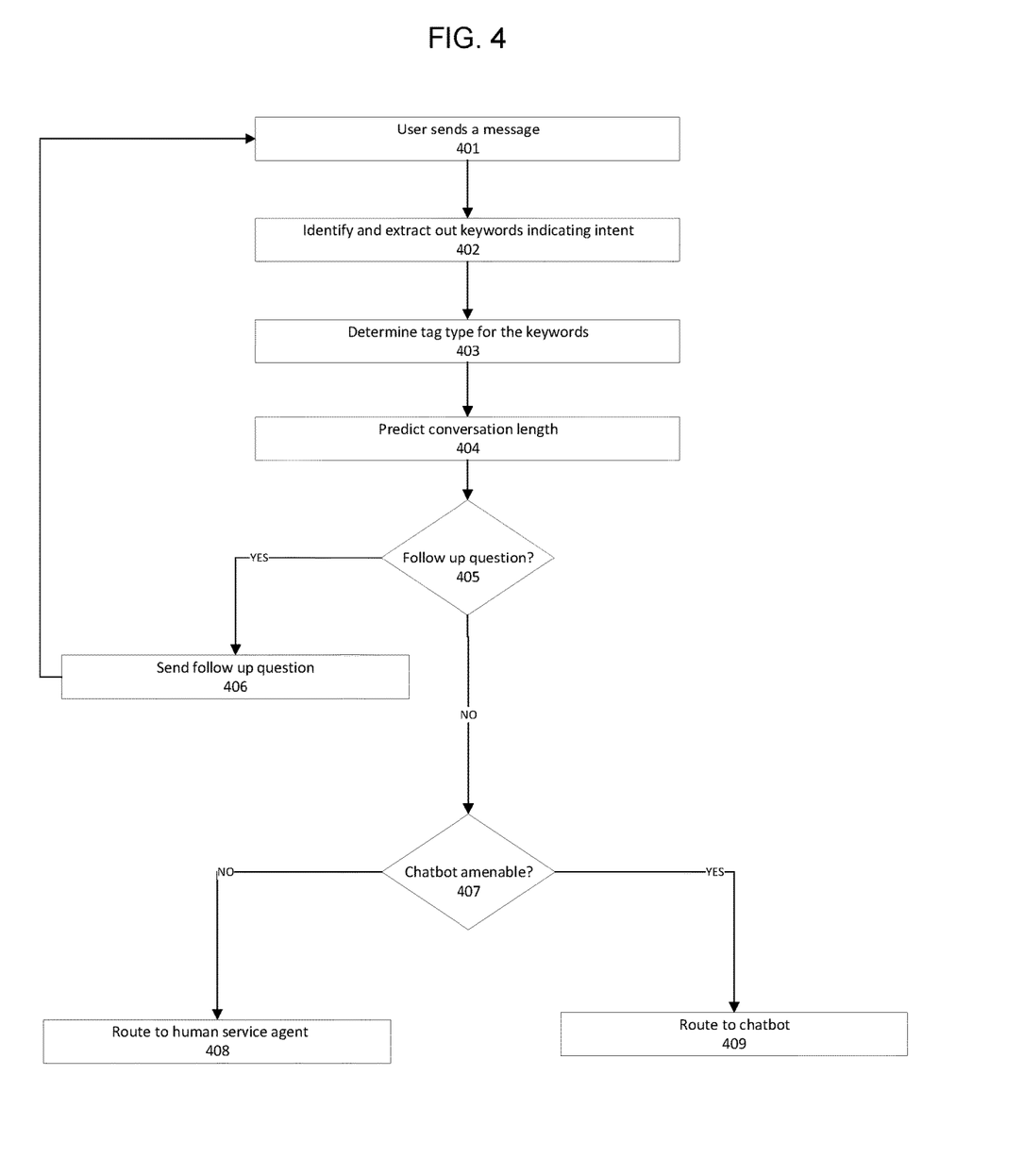
FIG. 4 illustrates a method for performing routing based on message content in accordance with an exemplary embodiment.

FIG. 4 illustrates a method for performing routing based on message content in accordance with an exemplary embodiment. FIGS. 5A-5E illustrate various sample data utilized in predicting a conversation length in accordance with an exemplary embodiment.

According to exemplary aspects, a MCBRS looks for presence of specific user interests that indicate a shorter conversation that a chatbot may successfully manage (e.g., location restriction, cuisine preferences and planning for an imminent outing). Further, the MCBRS system also looks for absence of user interests that indicate a longer, more complex conversation (e.g., user mentions of the relationships between those in their party, a future event) and based on the manifest user interests decides to route the user to a chatbot or to a human for assistance. For example, a request for dining recommendation for a casual outing with a friend to occur within next hour or so may indicate shorter conversation. In an example, the following message may trigger less than 5 messages in total: "A good buzzing sushi spot in West Hollywood area—sake bombs and the works". In contrast, a request for dining recommendation for an anniversary dinner that is to occur next month may indicate a longer conversation. In an example, the following message may trigger more than 40 messages in total: "Hi! Birthday dinner recommendation. Three people on a Friday, early evening with awesome cocktails, inventive desserts (or just really great ones), memorable food that isn't spicy. Mom is paying. Work in Chelsea, going to Gowanus after so preferably downtown Manhattan or Brooklyn close to trains."

However, for longer conversations that may require larger number of message exchanges, a chatbot may be ill suited to perform such a function. For example, in longer conversations, communications performed by a chatbot may become increasingly more apparent it is not provided by a human, and purely automated approaches like chatbots may be negatively perceived by users in terms of perceived quality of service.

In this regard, the MCBRS identifies and distinguishes user interests that suggest a chatbot-amenable conversation, which may be referred to a positive interests, and user interests that suggest a more complex conversation that is better facilitated by a human, which may be referred to as negative interests. The positive and negative interests may then be combined to gauge whether a chatbot or a human is most appropriate assistant and a user may be routed accordingly. In an example, the positive and negative interests may be weighted based on a heuristic model, and a total weight with respect to a reference threshold may indicate whether a conversation initiated by the user would be chatbot-amenable or not. Once the reference threshold is met, then the user may be routed to a human service agent. If the reference threshold is not met, then the user may be determined to be amenable to communicating with a chatbot, and may start or continue communication with the chatbot. Although automated servicing is described with respect to a chatbot, aspects of the present disclosure are not limited thereto, such that other automated servicing may be performed In operation 401, a user sends a message to the MCBRS. The message may be sent by a user device, such as a mobile phone, a mobile computing device, a personal computer, and the like. The message may be a text message, an internet-based chatting message, a voice message and the like. In an example, the message may indicate an interest, such as a location, size or dining party, cuisine preference and the like. According to exemplary aspects, the initial message sent by the user may be received by a chatbot. However, aspects of the present disclosure are not limited thereto, such that the initial message may be received by a message board or a default message capturing platform.

In operation 402, one or more AI or ML algorithms may be applied on the received message to identify extract keywords. One or more AI or ML algorithms may include a natural language processing (NLP) algorithm that is capable of identifying and extracting certain words from a message sent by a user. For example, key words identified by the NLP algorithm may indicate cuisine type based on language such as "Italian", "American", "Mexican", "Indian", "spicy", "creamy", "tempura" and the like. NLP algorithm may also identify a meal type (e.g., "lunch", "dinner", "brunch", "bar" and etc.), vibe/ambience/theme (e.g., "casual", "intimate", "fine-dining", "relaxed" and etc.), price (e.g., "cheap", "moderately expensive", "upscale", "fancy" and etc.), dietary restrictions (e.g., "vegan", "gluten-free", "vegetarian", "non-egg" and etc.), relationships (e.g., "mom", "boyfriend", "sister-in-law", "family" and etc.), timing (e.g., "this week", "tomorrow", "next month", "not urgent" and etc.), and/or gratitude/humor (e.g., "thxx", "Thank you", "lol", "Hahaha" and etc.). Although various categories of key words have been identified above, aspects of the present disclosure are not limited thereto, such that language directed to additional or different topics, such as movies or an outing, may be provided. Further, although sample terms are provided herein, aspects of the present disclosure are not limited thereto, such that negative intent terms, such as "not Italian", "thank you anyways" or the like, may be recognized. Further, sarcasm may also be detected, along with location based tags and the like.

In operation 403, a tag type is determined for each of the keywords identified and extracted. According to exemplary aspects, tag types may include, without limitation, cuisine, meal type, vibe, price, diet, relationship, non-urgency, timing, gratitude or the like. Although tag types corresponding to a meal outing is exemplarily disclosed above, aspects of the disclosure are not limited thereto, such that additional tag types may be present for different outings or interests. For example, tag types corresponding to various attractions, events, hotel accommodations, car rentals, or the like may also be included.

Figure 5A:
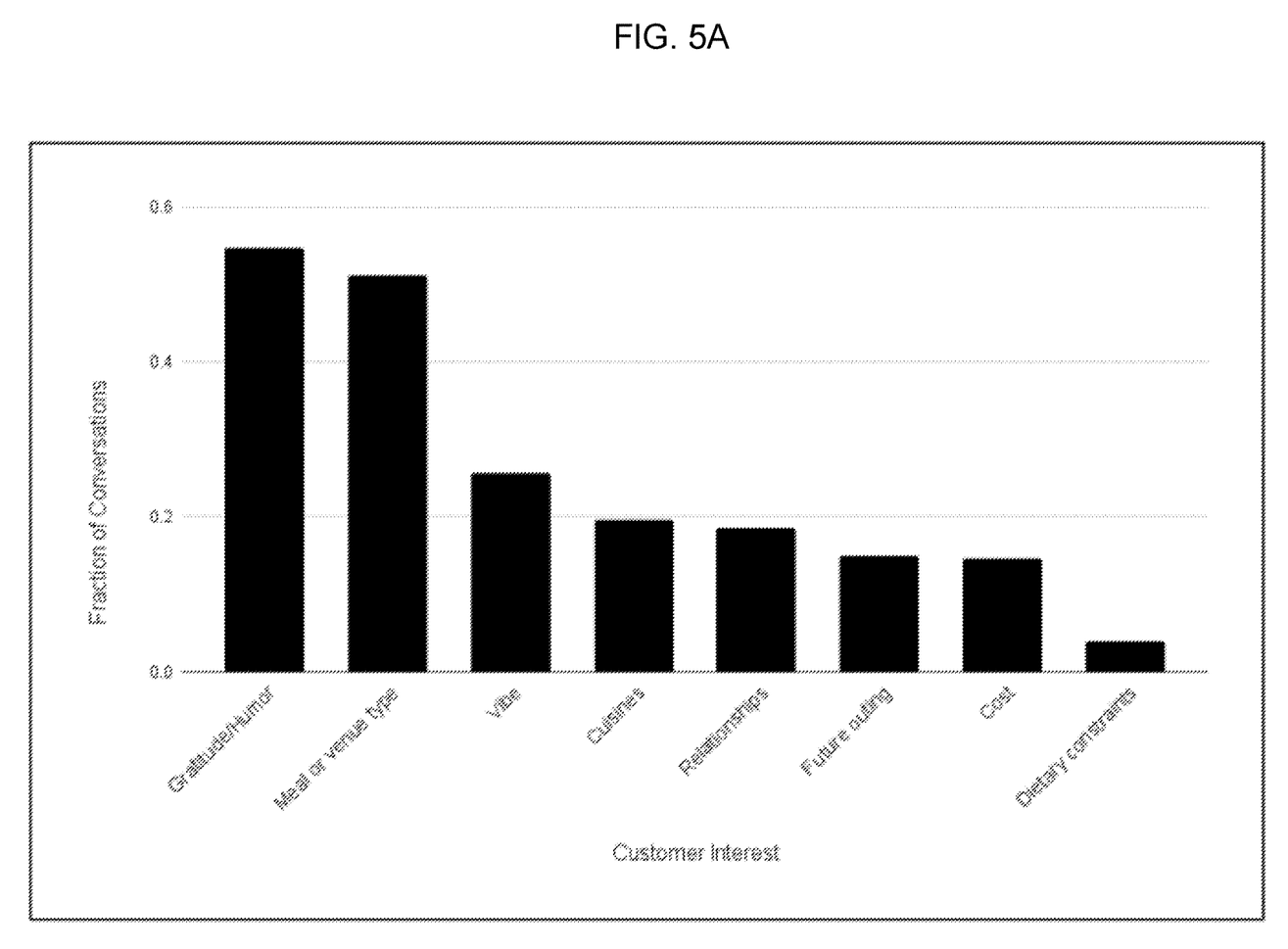
FIGS. 5A-5E illustrate various sample data utilized in predicting a conversation length in accordance with an exemplary embodiment.

As exemplarily illustrated in FIG. 5A, various keywords may be categorized into one of predefined tag types, such as Gratitude/Humor, Meal or venue type, Vibe, Cuisines, Relationships, Future outing, Cost and Dietary constraints. In an example, future outing may indicate an outing that is one or more days away. Although various tag types are exemplarily illustrated, aspects of the present disclosure are not limited thereto, such that other types may also be provided. The predefined tag types may be updated/modified or deleted based on additional data. Also, new tag types may be generated if the existing tag types are determined to be ill suited for capturing the intent of the user. Further, although conversations related to dining are provided, aspects of the present disclosure are not limited thereto, such that tag types related to hotel accommodations, vacation trips, event planning and the like may also be included.

Moreover, among the available categories, filtered listing of categories may be provided. For example, only the categories accounting for certain fraction of conversations may be displayed for improved display of information. Further, the categories may be illustrated in a descending order to indicate interests of the users.

In operation 404, a prediction of conversation length or expected number of messages is determined based on the determined tag types. In an example, the number of messages may indicate only the number of messages sent by the user or a total number of messages exchanged by the user and a service provider (e.g., a chatbot or a live service agent).

Figure 5B:
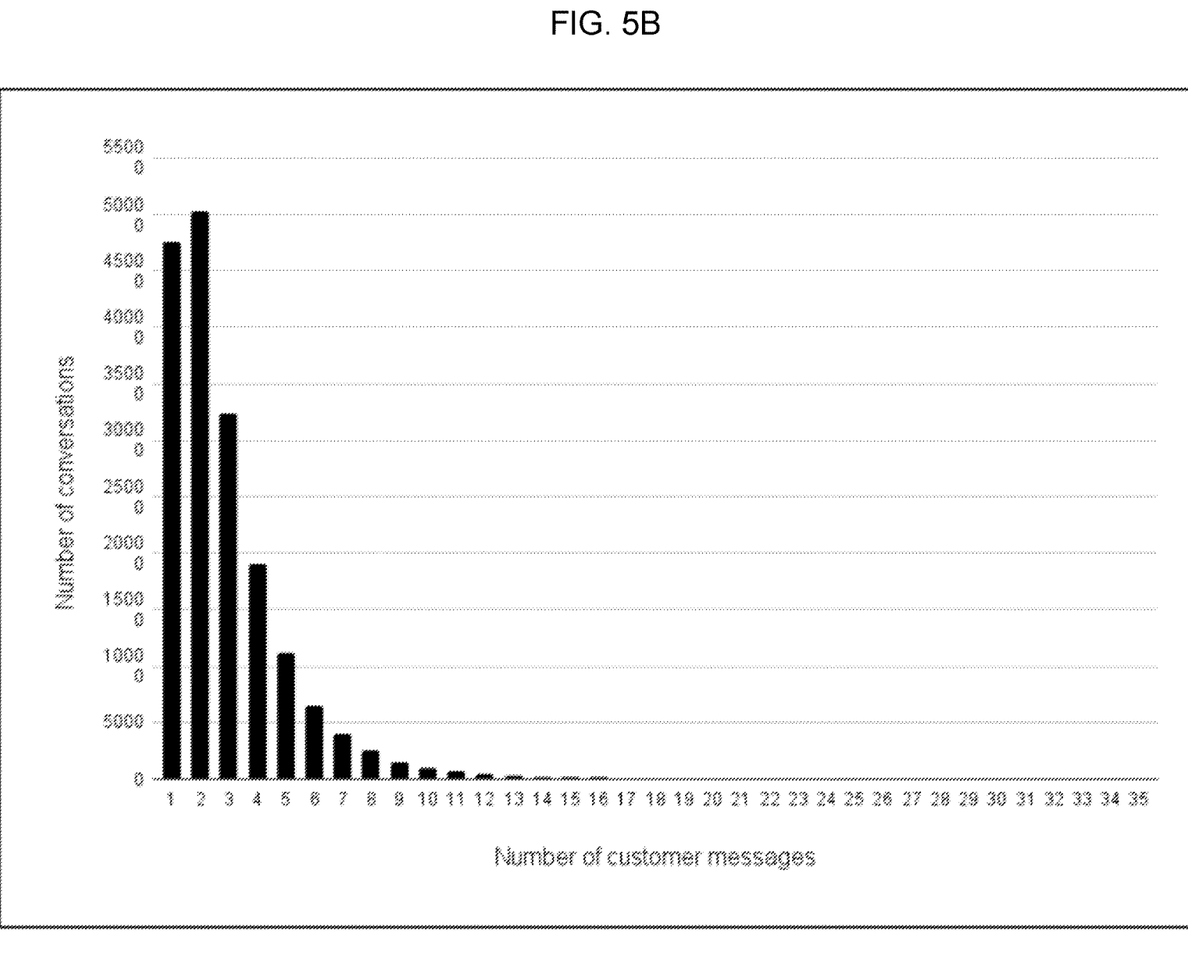
Figure 5C:
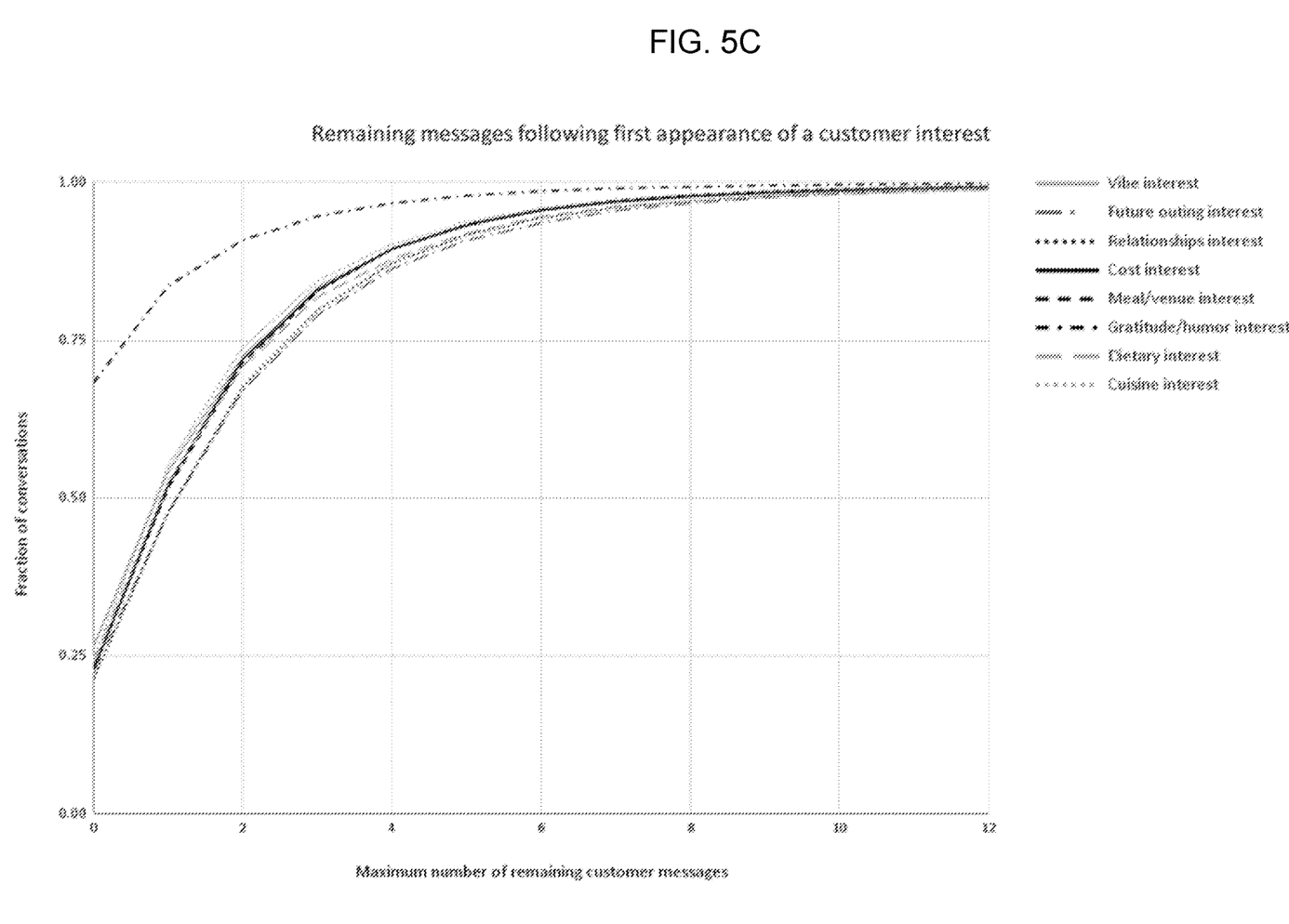
Figure 5D:
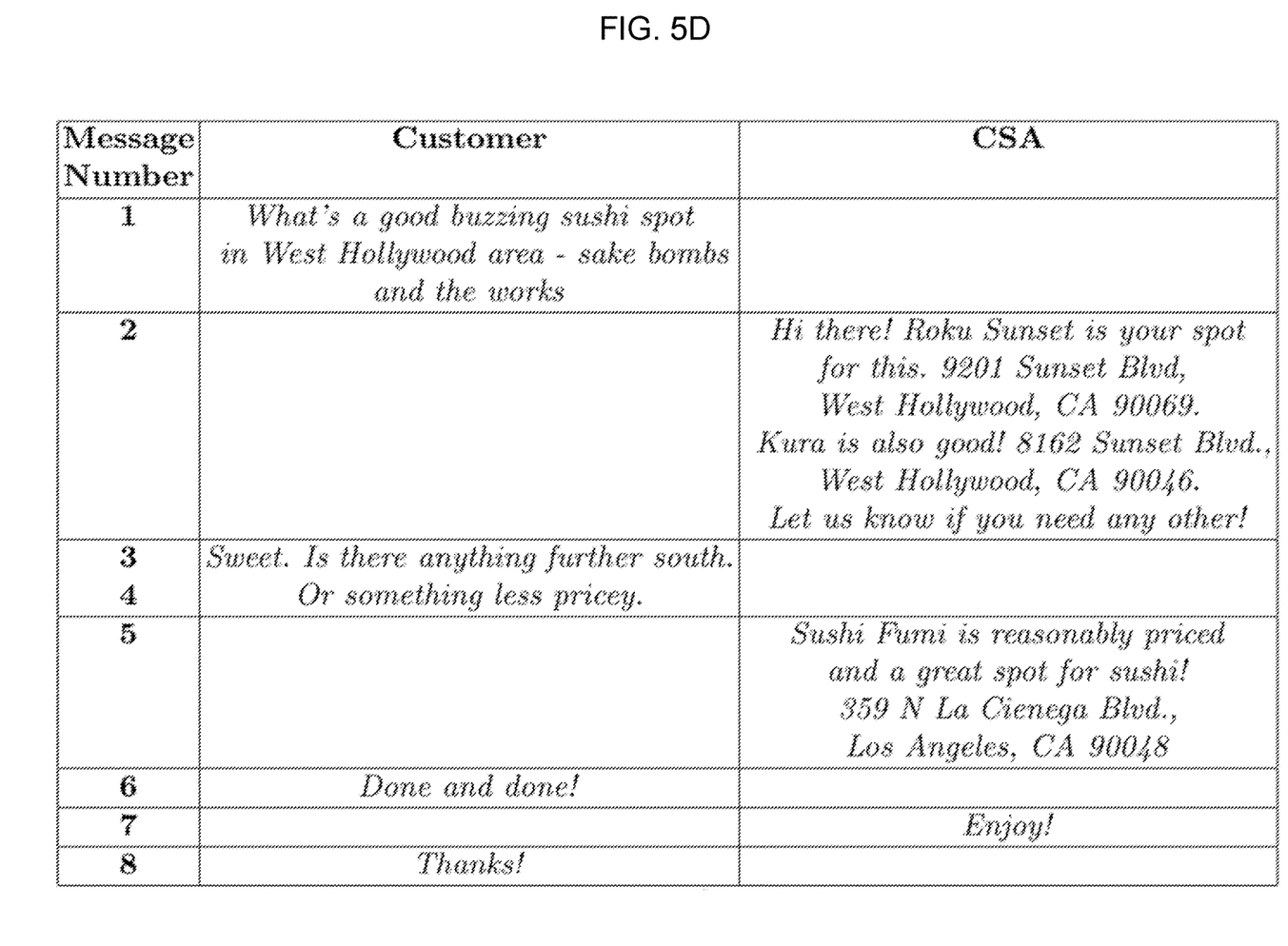

According to exemplary embodiments, certain tag types may indicate a likely or possible conversation length. As exemplarily illustrated in FIG. 5B, user inquiries may be short or lengthy. For example, FIG. 5B illustrates that almost 90% of the conversations have 5 or fewer messages sent by a user or customer. However, more approximately 10% of the conversations, more than 5 messages are sent by the user or customer to obtain desired information. The 90% of the conversations having 5 or fewer messages may share common tag types or combination of tag types, whereas 10% of the conversations requiring more than 5 messages may share different common tag types or combination of tag types. For example, as exemplarily illustrated in FIG. 5C, certain tag types (i.e., future outing interest) may indicate higher percentage of conversations that are expected to receive additional messages from the user or customer. FIG. 5D exemplarily illustrates a sample conversation that includes 5 messages sent by a customer, and servicing by a customer service agent (CSA). In an example, conversations requiring 5 messages sent by user or customer may be determined to be amenable to automated servicing, such as by a chatbot.

For example, keywords corresponding to non-urgent tag type may indicate a conversation length that would extend out to at least five messages or more. In contrast, keywords corresponding to cuisine tag type may indicate a predicted conversation length of two messages or less. Further, according to exemplary aspects, a predicted conversation length may be determined based on a combination tag types determined. Predicted conversation length or number of messages m ay be determined based on a heuristic model and/or one or more AI/ML algorithms.

In an example, AI or ML algorithms may be executed to perform data pattern detection, and to provide an output or render a decision (e.g., identification of a fact to be extracted) based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 405, whether a follow up question is necessary is determined in step 405. According to exemplary aspects, if the conversation length or number of messages is predicted to be above five messages, it may be determined that a chatbot may not be suitable for handle the content provided in the user message, and determine that no further follow up messages are required by the MCBRS. In such a case, the method proceeds to operation 407 to determine whether the user is amenable to be serviced by a chatbot or an automated service.

On the other hand, if it is determined that the conversation length or number of messages predicted is within a reference threshold, whether a follow up question is to be asked is determined. If further follow up message is determined to be asked, a corresponding follow up question is sent to the user in operation 406. For example, if a cuisine is specified in the first message, a follow up question regarding meal type, price or location may be asked by the MCBRS. According to exemplary aspects, the reference threshold may be a fixed value or a variable value that is dynamically adjusted based on a queue waiting for a live human service agent.

Figure 5E:
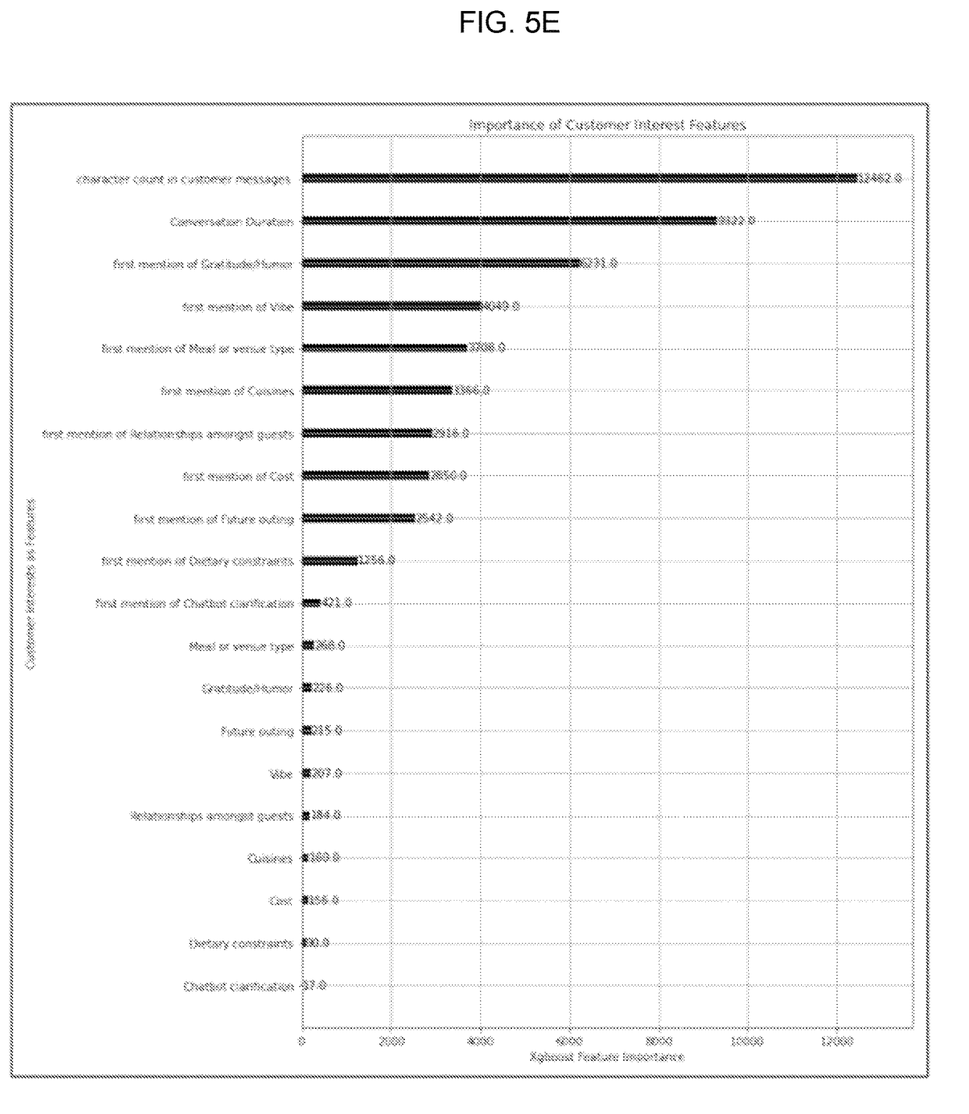

In operation 407, a determination of whether the user is amenable to be serviced by chatbot is made. According to exemplary aspects, it may be determined that the user is amenable to being serviced by the chatbot based on an aggregated weighted score with respect to a reference threshold. The weighted score may be determined based on the positive and negative interest indicated by keywords included in the messages sent by the user. In an example, weighting of the positive and negative interest and/or the reference threshold may be provided based on a heuristic model, which may be updated or adjusted with additional data. Moreover, the weighting and/or the threshold may be modified based on one or more AI/ML algorithms. As exemplarily illustrated in FIG. 5E, importance of customer interests and first appearance of each customer interest are illustrated. In FIG. 5E, the two measures of conversation length may provide heavier weight on predicting the total number of customer messages. However, FIG. 5E also illustrates that customer interests in cuisine and vibe are also factors for predicting the conversation length.

If the user is determined to be amenable to being serviced by the chatbot in operation 407, the user is routed to the chatbot in operation 409. On the other hand, if the user is determined not to be amenable to being serviced by the chatbot in operation 407, the user is routed to the human service agent in operation 408. Although aspects of the present disclosure are described with respect to a chatbot, aspects of the present disclosure are not limited thereto, such that other automated service may be provided in lieu of or in addition to the chatbot.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is no t intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing differential routing based on message content, the method comprising:
   performing, using a processor and a memory:
   receiving, from a user device, a message inquiry including a reference to a future event;
   identifying and extracting one or more keywords from the message inquiry;
   determining, for each of the one or more keywords, a corresponding tag type;
   identifying the future event and an amount of time remaining before the future event;
   predicting a number of messages to be sent by the user device based on the determined tag type for each of the one or more keywords and the amount of time remaining before the future event, wherein the amount of time remaining before the future event corresponds to a predicted length of a conversation;
   determining whether the number of messages predicted is less than or equal to a reference threshold;
   when the number of messages predicted is greater than the reference threshold, routing the message inquiry to a service agent;
   when the number of messages predicted is less than or equal to the reference threshold, transmitting a follow up inquiry corresponding to the message inquiry to the user device, wherein a specificity level of the follow up inquiry is higher than that of the message inquiry;
   receiving, from the user device, a response to the follow up inquiry;
   determining whether the message inquiry is amenable to being serviced by an automated service based on the predicted number of messages to be sent by the user device and based on the response to the follow up inquiry having the specificity level higher than that of the message inquiry;
   routing the message inquiry to the automated service when the number of message predicted is less than or equal to the reference threshold and the message inquiry is determined to be amenable to being serviced by the automated service; and
   routing the message inquiry to the service agent when the number of message predicted is less than or equal to the reference threshold and the message inquiry is determined not to be amenable to being serviced by the automated service.

2. The method according to claim 1, wherein the automated service is provided by a chatbot.

3. The method according to claim 2, wherein the determining of whether the message is amenable to being service by the automated service is determined based on an aggregated weighted value of the determined tag type for each of the one or more keywords.

4. The method according to claim 3, wherein the determined tag type indicates at least one of a cuisine type, vibe/ambience/theme, price, dietary restrictions, relationships, timing, and gratitude/humor.

5. The method according to claim 3, wherein
   the determined tag type indicates at least one of a positive interest or a negative interest,
   the positive interest being user interest that suggests being amenable to the automated service, and
   the negative interest being user interest that suggests being better facilitated by a human service agent.

6. The method according to claim 3, wherein weighting of the determined tag type is determined based on a heuristic model.

7. The method according to claim 3, wherein weighting of the determined tag type is determined based on one or more artificial intelligence (AI) or machine learning (ML) models.

8. The method according to claim 3, wherein the determining of whether the message is amenable to being service by the automated service is further determined in view of the reference threshold.

9. The method according to claim 8, wherein the reference threshold is adjusted or modified by one or more AI or ML models.

10. The method according to claim 1, wherein the identifying and extracting one or more keywords are performed via a natural language processing (NLP) algorithm.

11. The method according to claim 3, wherein weighting of the determined tag type is determined based on a queue to a human service agent.

12. The method according to claim 1, wherein the message inquiry is one of a text message, an internet-based chatting message, or a voice message.

13. The method according to claim 1, wherein the determining whether the message inquiry is amenable to being serviced by the automated service is further based on availability of the service agent.

14. The method according to claim 1, wherein the reference threshold is five messages.

15. A system to perform differential routing based on message content, the system comprising:
   at least one processor;
   at least one memory; and
   at least one communication circuit,
   wherein the at least one processor performs:
   receiving, from a user device, a message inquiry including a reference to a future event;
   identifying and extracting one or more keywords from the message inquiry;
   determining, for each of the one or more keywords, a corresponding tag type;
   identifying the future event and an amount of time remaining before the future event;
   predicting a number of messages to be sent by the user device based on the determined tag type for each of the one or more keywords and the amount of time remaining before the future event, wherein the amount of time remaining before the future event corresponds to a predicted length of a conversation;
   determining whether the number of messages predicted is less than or equal to a reference threshold;
   when the number of messages predicted is greater than the reference threshold, routing the message inquiry to a service agent;
   when the number of messages predicted is less than or equal to the reference threshold, transmitting a follow up inquiry corresponding to the message inquiry to the user device, wherein a specificity level of the follow up inquiry is higher than that of the message inquiry;

receiving, from the user device, a response to the follow up inquiry;

determining whether the message inquiry is amenable to being serviced by an automated service based on the predicted number of messages to be sent by the user device and based on the response to the follow up inquiry having the specificity level higher than that of the message inquiry;

routing the message inquiry to the automated service when the number of message predicted is less than or equal to the reference threshold and the message inquiry is determined to be amenable to being serviced by the automated service; and routing the message inquiry to the service agent when the number of message predicted is less than or equal to the reference threshold and the message inquiry is determined not to be amenable to being serviced by the automated service.

16. A non-transitory computer readable storage medium that stores a computer program for performing differential routing based on message content, the computer program, when executed by a processor, causing a system to perform a process comprising:

receiving, from a user device, a message inquiry including a reference to a future event;

identifying and extracting one or more keywords from the message inquiry;

determining, for each of the one or more keywords, a corresponding tag type;

identifying the future event and an amount of time remaining before the future event;

predicting a number of messages to be sent by the user device based on the determined tag type for each of the one or more keywords and the amount of time remaining before the future event, wherein the amount of time remaining before the future event corresponds to a predicted length of a conversation;

determining whether the number of messages predicted is less than or equal to a reference threshold;

when the number of messages predicted is greater than the reference threshold, routing the message inquiry to a service agent;

when the number of messages predicted is less than or equal to the reference threshold, transmitting a follow up inquiry corresponding to the message inquiry to the user device, wherein a specificity level of the follow up inquiry is higher than that of the message inquiry;

receiving, from the user device, a response to the follow up inquiry;

determining whether the message inquiry is amenable to being serviced by an automated service based on the predicted number of messages to be sent by the user device and based on the response to the follow up inquiry having the specificity level higher than that of the message inquiry;

routing the message inquiry to the automated service when the number of message predicted is less than or equal to the reference threshold and the message inquiry is determined to be amenable to being serviced by the automated service; and routing the message inquiry to the service agent when the number of message predicted is less than or equal to the reference threshold and the message inquiry is determined not to be amenable to being serviced by the automated service.

* * * * *